US012738867B2

(12) United States Patent
Hu

(10) Patent No.: US 12,738,867 B2
(45) Date of Patent: Sep. 15, 2026

(54) BI-DIRECTIONAL SPLIT-PHASE INVERTER CIRCUIT AND BI-DIRECTIONAL SPLIT-PHASE INVERTER

(71) Applicant: Huizhou RoyPow Technology Co., Ltd., Guangdong Province (CN)

(72) Inventor: Yanshen Hu, Guangdong Province (CN)

(73) Assignee: HUIZHOU ROYPOW TECHNOLOGY CO., LTD., Guangdong Province (CN)

(*) Notice: Subject to any disclaimer, the term of this patent is extended or adjusted under 35 U.S.C. 154(b) by 385 days.

(21) Appl. No.: 18/227,268

(22) Filed: Jul. 27, 2023

(65) Prior Publication Data

US 2024/0204692 A1 Jun. 20, 2024

(30) Foreign Application Priority Data

Dec. 14, 2022 (CN) ........................ 202211601783.X

(51) Int. Cl.
*H02M 7/797* (2006.01)
*H02M 1/00* (2007.01)
(Continued)

(52) U.S. Cl.
CPC ......... *H02M 7/797* (2013.01); *H02M 1/0009* (2021.05); *H02M 1/08* (2013.01); *H02M 1/126* (2013.01); *H02M 7/003* (2013.01)

(58) Field of Classification Search
CPC ...... H02M 7/797; H02M 1/0009; H02M 1/08; H02M 1/126; H02M 7/003; H02M 7/493;
(Continued)

(56) References Cited

U.S. PATENT DOCUMENTS

| | | | | |
|---|---|---|---|---|
| 10,199,957 | B1 * | 2/2019 | Prakash | H02M 7/5395 |
| 2013/0057200 | A1 * | 3/2013 | Potts | H02J 50/12 320/107 |
| 2022/0038028 | A1 * | 2/2022 | Chen | H02M 7/5387 |

FOREIGN PATENT DOCUMENTS

| | | |
|---|---|---|
| CN | 212627700 U | 2/2021 |
| CN | 112821794 A | 5/2021 |

(Continued)

OTHER PUBLICATIONS

Lixin, Y. et al. "Research on a Novel High Performance DC/DC Switching Converter based on Coupled Inductors and Planar Transformers Technique", vol. 10, No. 3, 2012, 8 pages (English abstract).

*Primary Examiner* — Thienvu V Tran
*Assistant Examiner* — Lauren Ashley Shaw
(74) *Attorney, Agent, or Firm* — CANTOR COLBURN LLP

(57) ABSTRACT

The disclosure provides a bi-directional split-phase inverter circuit and a bi-directional split-phase inverter. The circuit includes a positive DC bus, a negative DC bus, first and second DC filter capacitor units, MAC filter capacitor units, M bi-directional switch networks, a neutral wire and M live wires. The circuit adopts the inverting coupling transformer for bi-directional power conversion, the switch bridge arm may realize a current loop, such that before a corresponding power switch transistor of the switch bridge arm turns on, its body diode is turned on first, thus reducing the reverse recovery power consumption of the body diode of the corresponding power switch transistor and realizing the zero voltage soft switching, and reducing the switch power consumption of the power switch transistor. The midpoint of the inverting coupling transformer may provide multi-level output, further reducing the switch power consumption of the power switch transistor.

14 Claims, 9 Drawing Sheets

(51) Int. Cl.
*H02M 1/08* (2006.01)
*H02M 1/12* (2006.01)
*H02M 7/00* (2006.01)

(58) Field of Classification Search
CPC .. H02M 7/483; H02M 1/0064; H02M 7/5387; H02M 1/0043; Y02B 70/10
USPC .......................................................... 363/800
See application file for complete search history.

(56) References Cited

FOREIGN PATENT DOCUMENTS

| | | | | | |
|---|---|---|---|---|---|
| CN | 113630029 | A | | 11/2021 | |
| CN | 114744901 | A | | 7/2022 | |
| CN | 115224740 | A | | 10/2022 | |
| CN | 118232697 | A | * | 6/2024 | ............ H02M 1/088 |

* cited by examiner

BI-DIRECTIONAL SPLIT-PHASE INVERTER CIRCUIT AND BI-DIRECTIONAL SPLIT-PHASE INVERTER

CROSS-REFERENCE TO RELATED APPLICATIONS

This application claims the benefit of Chinese Patent Application No. 202211601783.X, entitled BI-DIRECTIONAL SPLIT-PHASE INVERTER CIRCUIT AND BI-DIRECTIONAL SPLIT-PHASE INVERTER, which was filed with China National Intellectual Property Administration on Dec. 14, 2022, and the entire contents of which are incorporated herein by reference.

TECHNICAL FIELD

The present disclosure relates to the technical field of power electronics, in particular to a bi-directional split-phase inverter circuit and bi-directional split-phase inverter.

BACKGROUND

In the power supply systems of the countries in North America, generally, a dual-live-wire mode (L1-L2) or a single-live-wire mode (L1-N and/or L2-N), as well a dual-live-wire-in-parallel mode (L1-N/L2-N) are adopted, and the three modes are allowed to switch flexibly, besides, bi-directional power conversion should be realized, which result in complexity in designing a bi-directional split-phase inverter. Bi-directional split-phase inverters usually adopt a bi-directional symmetry full-bridge inverter circuit, which is also generally known as a bi-directional split-phase H4 topology because of it uses four power switch transistors and the body diodes thereof.

In case where the bi-directional split-phase H4 topology adopts the traditional bipolar high frequency sinusoidal pulse width modulation (SPWM) mode, the four power switch transistors all operate in the high frequency hard switching state, the switch power consumption is large, especially the reverse recovery power consumption of the body diodes is large, resulting in low conversion efficiency. In order to improve the conversion efficiency, unipolar or hybrid modulation may be used, but it will cause relatively high common-mode interference and relatively high leakage current.

SUMMARY

An objective of this disclosure is to provide a bi-directional split-phase inverter circuit, which is intended to solve the problem of relatively high switch power consumption of the traditional bi-directional split-phase inverter circuits.

A first aspect of the embodiments of this disclosure provides a bi-directional split-phase inverter circuit, including a positive DC bus, a negative DC bus, a first DC filter capacitor unit, a second DC filter capacitor unit, M AC filter capacitor units, M bi-directional switch networks, a neutral wire and M live wires, where $M \geq 2$;

the first DC filter capacitor unit is connected between the positive DC bus and the neutral wire, the second DC filter capacitor unit is connected between the negative DC bus and the neutral wire, and one of the AC filter capacitor units is connected between each one of the live wires and the neutral wire;

the bi-directional switch network includes an inverting coupling transformer, a filter inductor and multiple switch bridge arms;

a DC positive terminal and a DC negative terminal of the switch bridge arm are connected correspondingly and respectively with the positive DC bus and the negative DC bus, a bridge arm midpoint of each switch bridge arm is connected with a winding of the inverting coupling transformer, a midpoint of the inverting coupling transformer is connected with the filter inductor and with one of the live wires.

Optionally, the bi-directional split-phase inverter circuit further includes:

a controller, which is connected with the positive DC bus, the negative DC bus, the M live wires and the M bi-directional switch networks respectively, and is used for outputting, according to a driving instruction and electrical sampling signals of the positive DC bus, negative DC bus and live wires, a driving voltage of corresponding voltage value to each of the switch bridge arms to drive the bi-directional switch networks to perform rectification or AC conversion, and correspondingly outputting an AC signal or a DC signal of a preset voltage value.

Optionally, the live wires include a first live wire and a second live wire;

the controller includes:

a first voltage sampling unit, which is connected to the positive DC bus and performs voltage sampling on the positive DC bus to generate a first voltage sampling signal;

a second voltage sampling unit, which is connected to the negative DC bus and performs voltage sampling on the negative DC bus to generate a second voltage sampling signal;

a third voltage sampling unit, which is connected to the first live wire and performs voltage sampling on the first live wire to generate a third voltage sampling signal;

a fourth voltage sampling unit, which is connected to the second live wire and performs voltage sampling on the second live wire to generate a fourth voltage sampling signal;

a first current sampling unit, which is connected to the first live wire and performs current sampling on the first live wire to generate a first current sampling signal;

a second current sampling unit, which is connected to the second live wire and performs current sampling on the second live wire to generate a second current sampling signal;

a first comparison unit, which is connected to the first voltage sampling unit and to the first current sampling unit respectively, and is used for comparing the first voltage sampling signal and a first reference voltage signal, and generating a first feedback signal according to the comparison result and the first current sampling signal;

a second comparison unit, which is connected to the second voltage sampling unit and to the second current sampling unit respectively, and is used for comparing the second voltage sampling signal and a second reference voltage signal, and generating a second feedback signal according to the comparison result and the second current sampling signal;

a third comparison unit, which is connected to the third voltage sampling unit and to the second current sampling unit respectively, and is used for comparing the third voltage sampling signal and a third reference voltage signal, and generating a third feedback signal according to the comparison result and the second current sampling signal;

a fourth comparison unit, which is connected to the fourth voltage sampling unit and to the first current sampling unit respectively, and is used for comparing the fourth voltage sampling signal and a fourth reference voltage signal, and generating a fourth feedback signal according to the comparison result and the first current sampling signal;

a first control and wave generation unit, which is connected to the first comparison unit and to the second comparison unit respectively, and is used for generating a first control signal according to the first feedback signal and the second feedback signal;

a second control and wave generation unit, which is connected to the third comparison unit and to the fourth comparison unit respectively, and is used for generating a second control signal according to the third feedback signal and the fourth feedback signal;

a gating unit, which is connected to the first control and wave generation unit and to the second control and wave generation respectively, and is used for generating a PWM driving signal according to a control instruction, the first control signal and the second control signal; and a driver unit, which is connected to the gating unit and to the switch bridge arms of each bi-directional switch network respectively, and is used for generating a driving voltage of corresponding voltage value to each of the switch bridge arms according to the PWM driving signal, so as to drive the bi-directional switch network for rectification or AC conversion, and correspondingly outputting an AC signal or a DC signal of a preset voltage value.

Optionally, in case where M≥3, the M filter inductors are divided into two groups to be respectively connected to the two live wires, each group includes at least one of the filter inductors and is connected to a same one of the live wires, and each filter inductor is also connected to a midpoint of one of the inverting coupling transformers.

Optionally, the switch bridge arm includes two power switch transistors connected in series and two body diodes respectively connected with one of the power switch transistors in reverse parallel;

the two power switch transistors are connected in series and then connected between the positive DC bus and the negative DC bus, and a bridge arm midpoint of the two power switch transistors is connected with a winding of the inverting coupling transformer.

Optionally, the filter inductor is an equivalent leakage inductance of the inverting coupling transformer.

Optionally, the bi-directional split-phase inverter circuit further includes a free-wheeling bridge arm for free-wheel;

the free-wheeling bridge arm is connected between a midpoint of the inverting coupling transformer in the bi-directional switch network and the neutral wire.

Optionally, the free-wheeling bridge arm includes a first free-wheeling switch transistor and a second free-wheeling switch transistor;

the first free-wheeling switch transistor and the second free-wheeling switch transistor are connected in series and then connected between a first terminal of the filter inductor of the bi-directional switch network and the neutral wire.

Optionally, driving signals received by an upper arm and a lower arm of the switch bridge arm have potentials of opposite levels and are provided with a preset dead time, and condition of conduction of the switch bridge arm is $$D > 0.5 \text{ and } \Phi < (1 - D), \text{ or } D < 0.5 \text{ and } \Phi < D;$$

where D represents an operation duty ratio of the upper arm or the lower arm of the respective switch arms, $\phi$ represents an operation phase difference between the respective switch arms, and the operation phase difference is greater than the dead time of the respective switch arms.

A second aspect of the embodiments of this disclosure provides a bi-directional split-phase inverter, which includes the above-mentioned bi-directional split-phase inverter circuit.

The beneficial effects of the embodiments of this disclosure over the prior art are: in case where the above bi-directional split-phase inverter circuit adopts the inverting coupling transformer for bi-directional power conversion, the switch bridge arm may realize a current loop, such that before a corresponding power switch transistor of the switch bridge arm turns on, its body diode is turned on first, thus reducing the reverse recovery power consumption of the body diode of the corresponding power switch transistor and realizing the zero voltage soft switching, and reducing the switch power consumption of the power switch transistor. At the same time, the midpoint of the inverting coupling transformer may provide multi-level output, further reducing the switch power consumption of the power switch transistor.

DETAILED DESCRIPTION OF THE EMBODIMENTS

To make the technical problems to be solved, technical solutions and beneficial effects in this disclosure more clear, the disclosure is further described in detail in combination with the accompanying drawings and embodiments. It should be understood that the specific embodiments described herein are intended only to explain this disclosure rather than limit the disclosure.

In addition, the terms "first", "second" are used only for description and are not to be construed as indicating or suggesting relative importance or implying the number of technical features indicated. Thus, a feature defined by "first" or "second" may explicitly or implicitly include one or more of the features. In the description of this disclosure, "multiple" means two or more unless otherwise expressly specified.

A first aspect of the embodiments of this disclosure provides a bi-directional split-phase inverter circuit to realize the DC to AC inverter conversion and the AC to DC rectification.

Figure 1:
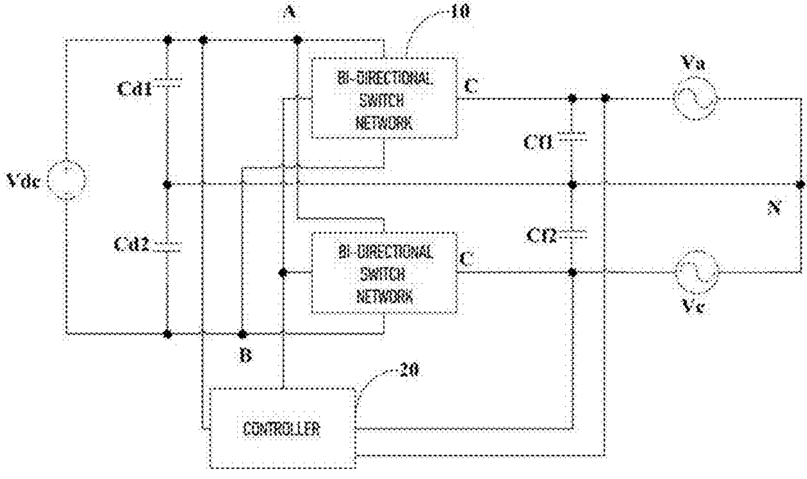
FIG. 1 is a schematic diagram of a first structure of a bi-directional split-phase inverter circuit provided in the embodiments of this disclosure.

In this case, as shown in FIG. 1, which is a schematic diagram of a first structure of a bi-directional split-phase inverter circuit provided in the embodiments of this disclosure, in this embodiment, a positive DC bus A, a negative DC bus B, a first DC filter capacitor unit Cd1, a second DC filter capacitor unit Cd2, M AC filter capacitor units Cf1 and Cf2, M bi-directional switch networks 10, a neutral wire N and M live wires C are included, where M≥2. The first DC filter capacitor unit is connected between the positive DC bus A and the neutral wire N, the second DC filter capacitor unit is connected between the negative DC bus B and the neutral wire N, and one AC filter capacitor unit is connected between each live wire C and the neutral wire N. Optionally, the first DC filter capacitor unit includes a first filter capacitor Cd1, which is connected between the positive DC bus A and the neutral wire N, and the second DC filter capacitor unit includes a second filter capacitor Cd2, which is connected between the negative DC bus B and the neutral wire N.

The AC filter capacitor unit includes a third filter capacitor, such as Cf1 or Cf2. Each third filter capacitor is connected between one live wire C and the neutral wire N.

The positive DC bus A and the negative DC bus B are used for the input and output of the DC power supply Vdc. The M live wires C are used for the input and output of the multiphase AC power supplies, such as the AC power supplies Va, Vc, and etc. The specific type of the AC power supply is not limited. Optional, M=2, that is, a first live wire and a second live wire are included. The first live wire is used for the output of the AC power supply Va, and the second live wire is used for the output of the AC power supply Vc.

Each bi-directional switch network 10 is connected between the positive DC bus A, the negative DC bus B and one live wire C, and used for receiving a corresponding driving voltage to realize the bi-directional power conversion for the DC power supply and the AC power supply of this phase.

In case where the bi-directional split-phase inverter circuit operates in the dual-live-wire inverter mode, the first DC filter capacitor unit, the second DC filter capacitor unit and two AC filter capacitor units are connected in series to perform filtering. Two di-directional switch networks 10 perform inverter conversion and supply power to the AC power supplies Va, Vc connected in series, while the load obtains power from the two live wires C rather than the wire N. In the single-live-wire mode, the first DC filter capacitor unit, the bi-directional switch network 10 connected with the first DC filter capacitor unit, and an AC filter capacitor unit constitutes a first bi-directional half-bridge inverter circuit the second DC filter capacitor unit, the bi-directional switch network connected with the second DC filter capacitor unit, and an AC filter capacitor unit constitutes a second bi-directional half-bridge inverter circuit, so as to form a bi-directional split-phase H4 topology, and the two bi-directional half-bridge inverter circuit supply power to Va, Vc through the wire N respectively. The dual-live-wire-in-parallel mode is similar to the single-live-wire, where the first live wire and the second live wire are connected in parallel and used for the output of the AC power supplies to the load, a bi-directional split-phase H4 topology is also formed with the only difference that the two live wires are directly connected in parallel, so the amplitudes, the frequencies and the phases of the two sets of single-phase AC voltages must be exactly the same.

Figure 2:
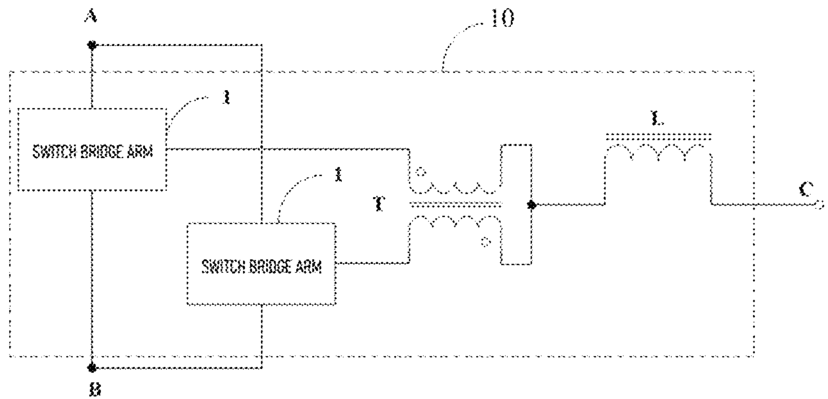
FIG. 2 is a schematic diagram of a first structure of a bi-directional switch network in the bi-directional split-phase inverter circuit shown in FIG. 1.

In this case, as shown in FIG. 2, the bi-directional switch network 10 includes an inverting coupling transformer T, a filter inductor L and multiple switch bridge arms 1;

The DC positive terminal and the DC negative terminal of the switch bridge arm 1 are connected correspondingly and respectively with the positive DC bus A and the negative DC bus B. The bridge arm midpoint of each switch bridge arm 1 is connected with a winding of the inverting coupling transformer T, and the midpoint of the inverting coupling transformer T is connected with one AC bus C through the filter inductor L. That is, the multiple switch bridge arms 1 are grouped to be connected respectively with the multiple windings of the inverting coupling transformer T. Each group includes at least one switch bridge arm 1. In case where each group includes multiple switch bridge arms 1, the multiple switch bridge arms 1 are connected in parallel to be connected with a corresponding winding of the inverting coupling transformer T, thus forming a multi-phase non-interleaved parallel bi-directional split-phase inverter circuit.

Figure 3:
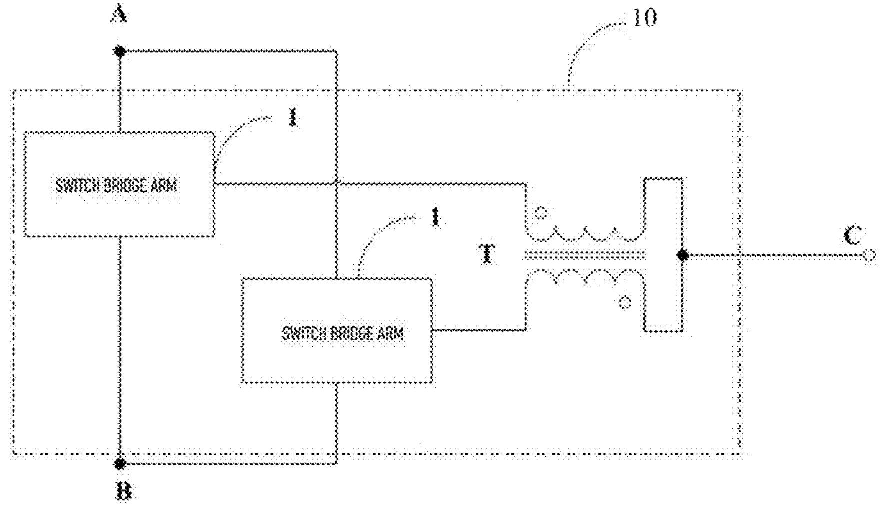
FIG. 3 is a schematic diagram of a second structure of the bi-directional switch network in the bi-directional split-phase inverter circuit shown in FIG. 1.

Optionally, the filter inductor L in the bidirectional switch network 10 may also be an equivalent leakage inductance of the inverting coupling transformer T. As shown in FIG. 3, correspondingly, the bidirectional switch network 10 may include: multiple switch bridge arms 1 and the inverting coupling transformer T, which may reduce the volume of the bi-directional split-phase inverter circuit.

In this case, the switch bridge arm 1 may be composed of a power switch transistor, which may be a high frequency transistor or an operating frequency transistor. The power switch transistor may be a full-controlled power semiconductor device, such as a Metal-Oxide-Semiconductor Field-Effect transistor (MOSFET), an insulated-gate bipolar transistor (IGBT), or may be a third generation semiconductor wide band gap (WBG) power devices, such as silicon carbide (SiC), gallium nitride (GaN) MOSFET, and etc.

Optionally, as shown in FIG. 1, the bi-directional split-phase inverter circuit also includes:

a controller 20, which is connected with the positive DC bus A, the negative DC bus B, the M live wires C and the M bi-directional switch networks 10 respectively. The controller 20 is used to output, according to a driving instruction and the electrical sampling signals of the positive DC bus A, negative DC bus B and live wires C, a driving voltage of corresponding voltage value to each switch bridge arm 1 to drive the bi-directional switch networks 10 to perform the rectification or the AC conversion, and correspondingly output an AC signal or a DC signal of a preset voltage value.

In this case, each switch bridge arm 1 of the bi-directional switch network 10 receives the driving voltage output by the controller 20 to perform the bi-directional split-phase inverter conversion, and the path from the DC power supply to the AC power supplies is as follows: the output of the DC power supply Vdc is filtered by the first DC filter capacitor unit and the second DC filter capacitor unit, and then passes through the switch bridge arms 1 inside the two bi-directional switch networks 10 for power conversion, to become two high frequency square waves; the two output high frequency square waves pass through two windings of the inverting coupling transformer T respectively and then into the filter inductor L, then pass through the AC filter capacitor units to be provided as sinusoidal waves to the AC power supplies.

After internal logic processing and control, the controller 20 outputs an appropriate driving voltage to the power switch transistors inside the switch bridge arms 1 such that they perform high-frequency switching operation with SPWM, to finally provide stable voltage or current of sinusoidal AC waveform to the AC power supplies Va and Vc. In turn, the power flow path (rectification) from the AC power supplies Va and Vc to the DC power supply and the working principle are similar, and will not be described herein. Therefore, the bi-directional split-phase inverter circuit may realize bi-directional power conversion.

The controller 20 determines the input conditions and load conditions, and controls the high-frequency switching operation of the power switch transistors by sampling the AC/DC output voltage and/or current, thus realizing a closed-loop operation process. The controller 20 may be built with discrete electronic elements, and may also be designed with and use ASIC, such as an analog control chip, a software programmed MCU, a digital signal processor (DSP) or a programmable logic device (FPGA/CPLD). The bi-directional split-phase inverter circuit may be in a form of discrete devices or in an integrated form, and may also be integrated into the controller 20 to form a large-scale hybrid integrated circuit. This high integrated design of the controller 20 may further reduce the volume of the bi-directional split-phase inverter.

Figure 4:
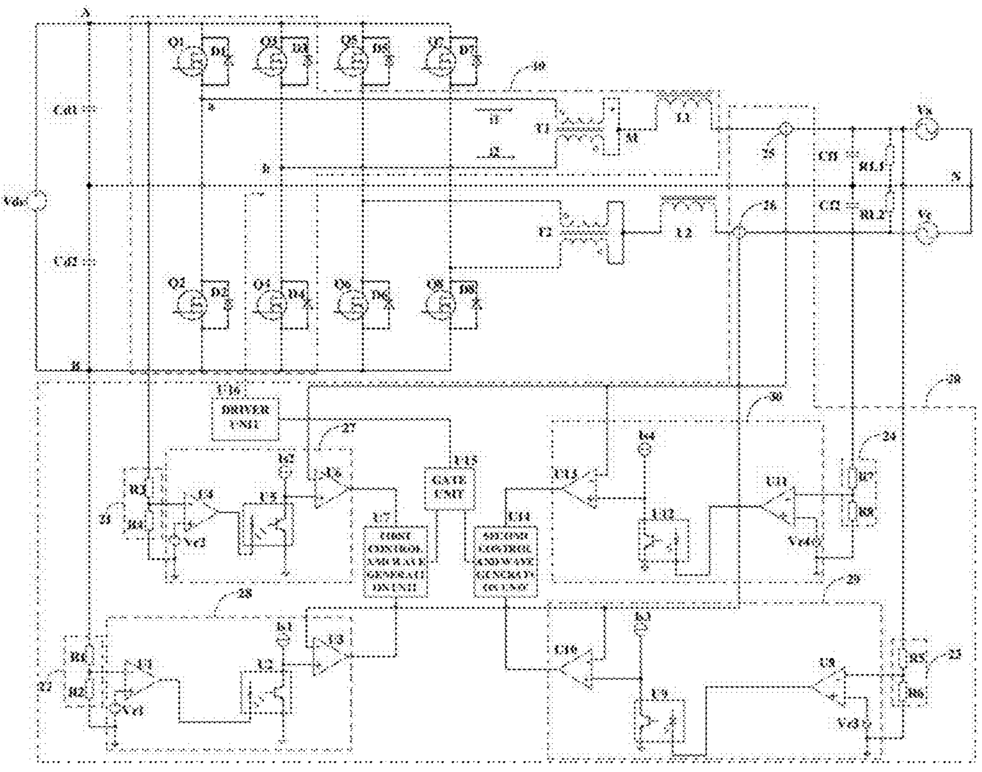
FIG. 4 is a schematic diagram of a second structure of the bi-directional split-phase inverter circuit provided in the embodiments of this disclosure.

Optionally, as shown in FIG. 4, the controller 20 includes:

a first voltage sampling unit 21, which is connected to the positive DC bus A and performs voltage sampling on the positive DC bus A to generate a first voltage sampling signal;

a second voltage sampling unit 22, which is connected to the negative DC bus B and performs voltage sampling on the negative DC bus B to generate a second voltage sampling signal;

a third voltage sampling unit 23, which is connected to the first live wire and performs voltage sampling on the first live wire to generate a third voltage sampling signal;

a fourth voltage sampling unit 24, which is connected to the second live wire and performs voltage sampling on the second live wire to generate a fourth voltage sampling signal;

a first current sampling unit 25, which is connected to the first live wire and performs current sampling on the first live wire to generate a first current sampling signal;

a second current sampling unit 26, which is connected to the second live wire and performs current sampling on the second live wire to generate a second current sampling signal;

a first comparison unit 27, which is connected to the first voltage sampling unit 21 and to the first current sampling unit 25 respectively, and is used for comparing the first voltage sampling signal and a first reference voltage signal, and generating a first feedback signal according to the comparison result and the first current sampling signal;

a second comparison unit 28, which is connected to the second voltage sampling unit 22 and to the second current sampling unit 26 respectively, and is used for comparing the second voltage sampling signal and a second reference voltage signal, and generating a second feedback signal according to the comparison result and the second current sampling signal;

a third comparison unit 29, which is connected to the third voltage sampling unit 23 and to the second current sampling unit 26 respectively, and is used for comparing the third voltage sampling signal and a third reference voltage signal, and generating a third feedback signal according to the comparison result and the second current sampling signal;

a fourth comparison unit 30, which is connected to the fourth voltage sampling unit 24 and to the first current sampling unit 25 respectively, and is used for comparing the fourth voltage sampling signal and a fourth reference voltage signal, and generating a fourth feedback signal according to the comparison result and the first current sampling signal;

a first control and wave generation unit U7, which is connected to the first comparison unit 27 and to the second comparison unit 28 respectively, and is used for generating a first control signal according to the first feedback signal and the second feedback signal;

a second control and wave generation unit U14, which is connected to the third comparison unit 29 and to the fourth comparison unit 30 respectively, and is used for generating a second control signal according to the third feedback signal and the fourth feedback signal;

a gating unit U15, which is connected to the first control and wave generation unit U7 and to the second control and wave generation U14 respectively, and is used for generating a PWM driving signal according to the control instruction, the first control signal and the second control signal;

a driver unit U16, which is connected to the gating unit U15 and to the switch bridge arms 1 of each bi-directional switch network 10 respectively, and is used for generating the driving voltage of corresponding voltage value to each switch bridge arm 1 according to the PWM driving signal, so as to drive the bi-directional switch network 10 for rectification or AC conversion, and correspondingly outputting the AC signal or the DC signal of a preset voltage value.

In this embodiment, as shown in FIG. 4, the first voltage sampling unit 21 is composed of a third resistor R3 and a fourth resistor R4. By using the resistors to divide the voltage, the voltage of the positive DC bus A is sampled, and the generated first voltage sampling signal is output to the first comparison unit 27. The first comparison unit 27 is composed of a first optocoupler U5, a second current source Is2, a second DC reference voltage source Vr2, a first voltage error amplifier U4 and a first current error amplifier U6. The first voltage sampling signal is input to the inverting input terminal of the first voltage error amplifier U4. The second DC reference voltage source Vr2 is connected to the non-inverting input terminal of the first voltage error amplifier U4. The output terminal of the first voltage error amplifier U4 is connected to the cathode of the input-side diode of the first optocoupler U5, the positive terminal of the first optocoupler U5 is connected to an internal voltage source (not shown), the emitter of the output-side transistor of the first optocoupler U5 is grounded, and collector is connected to the second current source Is2 and to the non-inverting input terminal of the first current error amplifier U6. The inverting input terminal of the first current error amplifier U6 is connected to the first current sampling unit 25. The output terminal of the first current error amplifier 25 is connected to the first input terminal of the first control and wave generation unit U7. The output terminal of the first control and wave generation unit U7 is connected to the input terminal of the gating unit U15. The output terminal of the gating unit U15 is connected to the input terminal of the driver unit U16. The output terminal of the driver unit U15 is connected to the respective power switch transistors of the switch bridge arms 1. Optionally, the current sampling unit may optionally adopt a current sensor, a current transformer or a resistor, etc.

The second voltage sampling unit 22 is composed of a first resistor R1 and a second resistor R2. By using the resistors to divide the voltage, the voltage of the negative DC bus B is sampled, and the generated second voltage sampling signal is output to the second comparison unit 28. The second comparison unit 28 is composed of a second optocoupler U2, a first current source Is1, a first DC reference voltage source Vr1, a second voltage error amplifier U1 and a second current error amplifier U3. The second voltage sampling signal is input to the inverting input terminal of the second voltage error amplifier U1. The first DC reference voltage source Vr1 is connected to the non-inverting input terminal of the second voltage error amplifier U1. The output terminal of the second voltage error amplifier U1 is connected to the cathode of the input-side diode of the second optocoupler U2, the positive terminal of the second optocoupler U2 is connected to the internal voltage source (not shown), the emitter of the output-side transistor of the second optocoupler U2 is grounded, and the collector is connected to the first current source Is1 and to the non-inverting input terminal of the second current error amplifier U3. The inverting input terminal of the second current error amplifier U3 is connected to the second current sampling unit 26. The output terminal of the second current error amplifier U3 is connected to the second input terminal of the first control and wave generation unit U7.

The third voltage sampling unit 23 is composed of a fifth resistor R5 and a sixth resistor R6. By using the resistors to divide the voltage, the voltage of the first live wire is sampled, and the generated third voltage sampling signal is output to the third comparison unit 29. The third comparison unit 29 is composed of a third optocoupler U9, a third current source Is3, a first AC reference voltage source Vr3, a third voltage error amplifier U8 and a third current error amplifier U10. The third voltage sampling signal is input to the inverting input terminal of the third voltage error amplifier U8. The first AC reference voltage source Vr3 is connected to the non-inverting input terminal of the third voltage error amplifier U8. The output terminal of the third voltage error amplifier U8 is connected to the cathode of the input-side diode of the third optocoupler U9, the positive terminal of the third optocoupler U9 is connected to the internal voltage source (not shown), the emitter of the output-side transistor of the third optocoupler U9 is grounded, and the collector is connected to the third current source Is3 and to the non-inverting input terminal of the third current error amplifier U10. The inverting input terminal of the third current error amplifier U10 is connected to the second current sampling unit 26. The output terminal of the third current error amplifier U10 is connected to the first input terminal of the second control and wave generation unit U14.

The fourth voltage sampling unit 24 is composed of a seventh resistor R7 and an eighth resistor R8. By using the resistors to divide the voltage, the voltage of the second live wire is sampled, and the generated fourth voltage sampling signal is output to the fourth comparison unit 30. The fourth comparison unit 30 is composed of a fourth optocoupler U12, a fourth current source Is4, a second AC reference voltage source Vr4, a fourth voltage error amplifier U11 and a fourth current error amplifier U13. The fourth voltage sampling signal is input to the inverting input terminal of the fourth voltage error amplifier U11. The second AC reference voltage source Vr4 is connected to the non-inverting input terminal of the fourth voltage error amplifier U11. The output terminal of the fourth voltage error amplifier U11 is connected to the cathode of the input-side diode of the fourth optocoupler U12, the positive terminal of the fourth optocoupler U12 is connected to the internal voltage source (not shown), the emitter of the output-side transistor of the fourth optocoupler U12 is grounded, and the collector is connected to the fourth current source Is4 and to the non-inverting input terminal of the fourth current error amplifier U13. The inverting input terminal of the fourth current error amplifier U13 is connected to the first current sampling unit 25. The output terminal of the fourth current error amplifier U13 is connected to the second input terminal of the second control and wave generation unit U14.

On the one hand, the gating unit U15 receives the control instruction to determine the power flow direction of the AC/DC side, on the other hand, it detects the voltage amplitude at the AC/DC side to determine the operation mode. The input terminal of the driver unit U16 is connected to the output terminal of the gating unit U15. And the gating unit U15 generates a PWM driving signal, which then passes through the driver unit U16 to generate multiple driving voltages to be output to the power switch transistors of the switch bridge arms 1.

In the dual-live-wire mode, U8 and U11 sample the AC output voltages Va and Vc respectively, and obtain the voltage between the two live wires after relative calculations. In the single-live-wire mode or dual-live-wire-in-parallel mode, U8 and U11 directly sample the AC output voltages Va and Vc respectively, and adjust the output voltages to achieve voltage stability through a corresponding voltage outer loop proportional integral (PI) compensation design. In the dual-live-wire mode, U10 or U13 samples the current of the filter inductor L1 or the current of the filter inductor L2 respectively, and one of the two is selected as the current sampling signal.

In the single-live-wire mode or the dual-live-wire-in-parallel mode, U10 and U13 directly sample the currents Ia and Ic of the filter inductors L1 and L2 respectively, and may adopt an average current mode or a peak current control mode through a corresponding current inner loop proportional integral (PI) compensation design, so as to improve the dynamic response performance. It should be noted that the voltage error amplifiers and the current error amplifiers in the controller 20 may adopt $2^{nd}$-order or $n^{th}$-order PI compensation or other intelligent control methods. Optionally, the controller 20 may also adopt other types of control mode, such as quasi-resonant control, single period control, continuous conduction mode (CCM), discontinuous conduction mode (DCM), critical conduction mode (CRM), and so on, without affecting its electrical performance and effect.

In order to further reduce the switch power consumption, the switch bridge arms 1 of each bi-directional switch network 10 may realize soft switching by adopting non-interleaved parallel technique. Optionally, the driving signals received by the upper and lower arms of the switch bridge arm have potentials of opposite levels and are provided with a preset dead time, and the condition of conduction of the switch bridge arm is:

$$D>0.5 \text{ and } \Phi<(1-D), \text{ or } D<0.5 \text{ and } \Phi<D;$$

where D represents the operation duty ratio of the upper or lower arms of the respective switch arms 1, ϕ represents the operation phase difference between the respective switch arms, and the operation phase difference is greater than the dead time of the respective switch arms.

The controller 20 may adopt the above modulation mode to ensure that the power switch transistors realize zero-voltage soft switching, so as to reduce or even eliminate the switch power consumption, and achieve higher conversion efficiency. Accordingly, the bi-directional split-phase inverter circuit may operate at a higher switching frequency, so as to reduce the volume of the inductors, capacitors and other passive devices, while reducing the cost.

Meanwhile, the above modulation mode may be adopted to realize the multilevel output at the midpoint of the inverting coupling transformer T, reduce the inductance of the filter inductor L, reduce the output harmonic wave, improve the power quality, and further reduce the switch power consumption of the power switch transistors.

Figure 6:
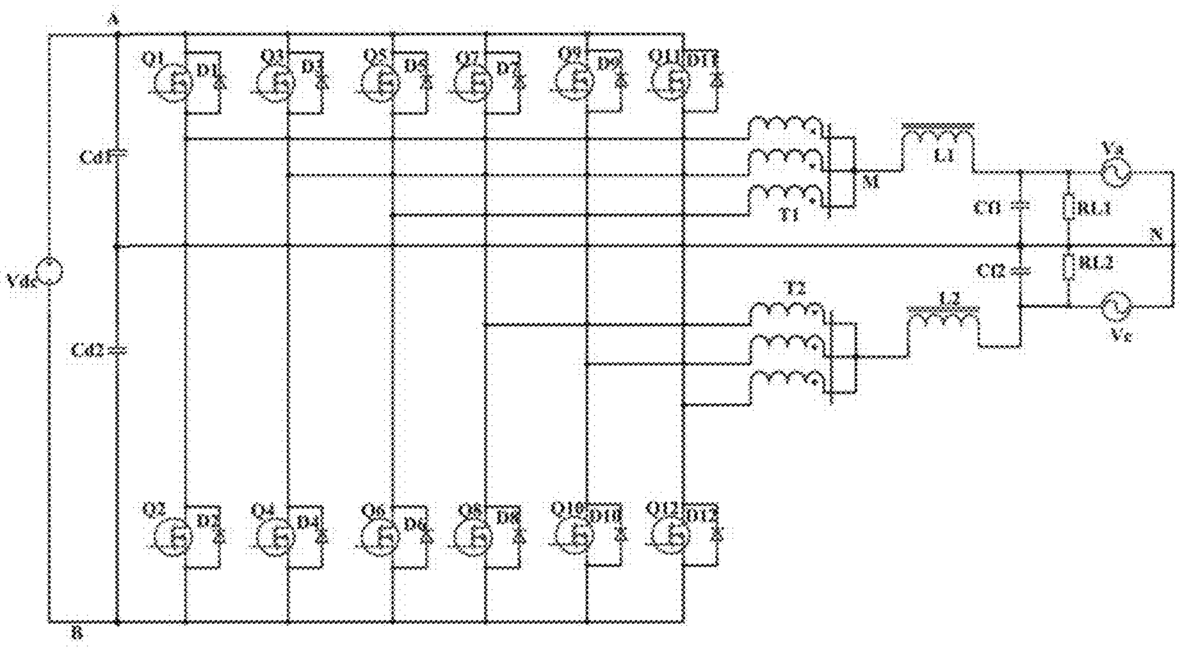
FIG. 6 is a schematic diagram of a third structure of the bi-directional split-phase inverter circuit provided in the embodiments of this disclosure.

Meanwhile, the number of the windings of the inverting coupling transformer T and the number of the bridge arms may be set to be at least two. For example, as shown in FIG. 4, each inverting coupling transformer T includes two windings, and each winding is connected to the bridge arm midpoint of one switch bridge arm 1; or as shown in FIG. 6, each inverting coupling transformer T includes three windings, and each winding is connected to the bridge arm midpoint of one switch bridge arm 1.

The following is to explain the operation principle of the bi-directional split-phase inverter circuit by considering a specific circuit.

Optionally, as shown in FIG. 4, the switch bridge arm 1 includes two power switch transistors connected in series and two body diodes respectively connected with one power switch transistor in reverse parallel;

the two power switch transistors are connected in series and then connected between the positive DC bus A and the negative DC bus B, and the bridge arm midpoint of the two power switch transistors is connected with a winding of the inverting coupling transformer T.

For example, the first switch bridge arm consists of a first power switch transistor Q1 and a second power switch transistor Q2 and the body diodes D1, D2 connected to the first power switch transistor Q1 and the second power switch transistor Q2. The second switch bridge arm consists of a third power switch transistor Q3 and a fourth power switch transistor Q4 and the body diode D3, D4 connected to the third power switch transistor Q3 and the fourth power switch transistor Q4. The first bi-directional switch network 10 consists of the first switch bridge arm, the second switch bridge arm, the first inverting coupling transformer T1 and the first filter inductor L1, and the first switch bridge arm and the second switch bridge arm constitute two non-interleaved parallel phases.

The third switch bridge arm 1 consists of a fifth power switch transistor Q5 and a sixth power switch transistor Q6 and the body diode D5, D6 connected to the fifth power switch transistor Q5 and the sixth power switch transistor Q6. The fourth switch bridge arm 1 consists of a seventh power switch transistor Q7 and an eighth power switch transistor Q8 and the body diode D7, D8 connected to the seventh power switch transistor Q7 and the eighth power switch transistor Q8. The second bi-directional switch network 10 consists of the third switch bridge arm 1, the fourth switch bridge arm 1, the second inverting coupling transformer T2 and the second filter inductor L2, and the third switch bridge arm 1 and the fourth switch bridge arm 1 constitute two non-interleaved parallel phases.

In the inverter operation mode, the first power switch transistor Q1 and the third power switch transistor Q3 operate in the high frequency sinusoidal pulse width modulation (SPWM) mode. The driving voltages of the second power switch transistor Q2 and the fourth power switch transistor Q4 are opposite to those of the first power switch transistor Q1 and the third power switch transistor Q3 respectively. And there is a certain dead time between the driving voltages of the first power switch transistor Q1 and the second power switch transistor Q2 and the driving voltages of the third power switch transistor Q3 and the fourth power switch transistor Q4.

Besides, the fifth power switch transistor Q5 and seventh power switch transistor Q7 operate in the high frequency sinusoidal pulse width modulation (SPWM) mode. The driving voltages of the sixth power switch transistor Q6 and eighth power switch transistor Q8 are opposite to those of the fifth power switch transistor Q5 and seventh power switch transistor Q7 respectively. And there is a certain dead time between the driving voltages of the fifth power switch transistor Q5 and the sixth power switch transistor Q6 and the driving voltages of the seventh power switch transistor Q7 and the eighth power switch transistor Q8.

Figure 5:
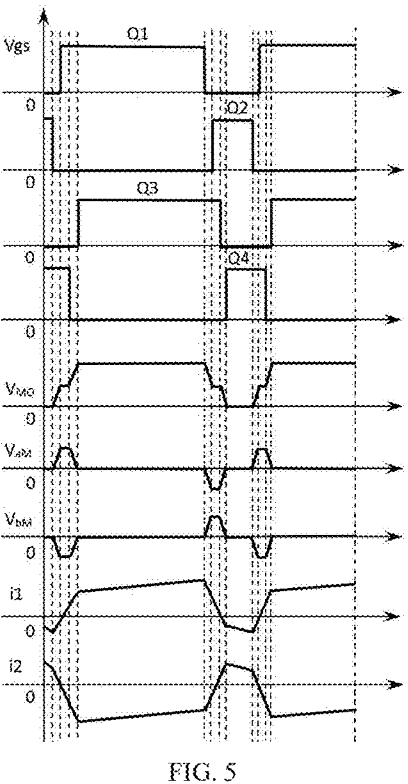
FIG. 5 shows schematic waveforms of the bi-directional split-phase inverter circuit provided in the embodiments of this disclosure.

The following takes the first bi-directional switch network 10 in the inverter operation mode as an example to illustrate the operation principle of the soft switching of the bi-directional split-phase inverter circuit:

Assuming that the operation duty ratio of the first power switch transistor Q1 and the third power switch transistor Q3 D>0.5. FIG. 5 shows several main operation waveforms, among which a represents the bridge arm midpoint of the first switch bridge arm in the bi-directional switch network 10, b represents the bridge arm midpoint of the second switch bridge arm, M represents the midpoint of the first inverting coupling transformer T1, O represents the negative terminal or ground of the DC power supply, $V_{MO}$ represents the voltage across M and O, $V_{aM}$ represents the voltage across the bridge arm midpoint a of the switch bridge arm 1 of the first bi-directional switch network 10 and the midpoint M of the first inverting coupling transformer T1 in FIG. 6, $V_{bM}$ represents the voltage across the bridge arm midpoint b of switch bridge arm 1 of the first bi-directional switch network 10 and the midpoint M of the first inverting coupling transformer T1 in FIG. 4.

As shown in FIG. 5, from top to bottom there are respectively the operation waveforms of the driving voltages Vgs, $V_{MO}$, $V_{aM}$, $V_{bM}$ of the first power switch transistor Q1 to the fourth power switch transistor Q4, and of the currents i1 and i2 flowing through the primary and secondary windings of the first inverting coupling transformer T1. The positive direction of the current is shown in FIG. 4.

In case where the first power switch transistor Q1 and the fourth power switch transistor Q4 both turn on, $V_{MO}$=½*Vdc, $V_{aM}$=½*Vdc, $V_{bM}$=−½*Vdc, i1 rises linearly and i2 falls linearly.

In case where the first power switch transistor Q1 and the third power switch transistor Q3 both turn on, $V_{MO}$=Vdc, $V_{aM}$=0, $V_{bM}$=0, and due to the influence of the leakage inductance, i1 continues to rise slightly, and i2 reverts to rise slightly.

In case where the third power switch transistor Q3 and the second power switch transistor Q2 both turn on, $V_{MO}$=½*Vdc, $V_{aM}$=−½*Vdc, $V_{bM}$=½*Vdc, i1 falls linearly and i2 rises linearly.

In case where the second power switch transistor Q2 and the fourth power switch transistor Q4 both turn on, $V_{MO}$=0, $V_{aM}$=0, $V_{bM}$=0, and due to the influence of the leakage inductance, i1 reverts to fall slightly, and i2 continues to fall slightly.

Because i1 and i2 are both negative before the first power switch transistor Q1 and the third power switch transistor Q3 turn on, they may realize zero voltage (ZVS) turn-on. Because i1 and i2 are both positive before the second power switch transistor Q2 and the fourth power switch transistor Q4 turn on, they may also realize ZVS turn-on. At the same time, the absolute values of i1 and i2 decrease linearly after the first power switch transistor Q1 to the fourth power switch transistor Q4 turn off, the reverse recovery power consumption of the body diodes is reduced or even eliminated. In addition, by using the drain-to-source parasitic capacitances of the first power switch transistor Q1 to the fourth power switch transistor Q4, or the respective external parallel small capacitances thereof, the first power switch transistor Q1 to the fourth power switch transistor Q4 may realize approximately zero voltage turn-off.

The operation principle of the second bi-directional switch network 10 is exactly the same, and will not be repeated here. In case where the duty ratio of the first power switch transistor Q1 and the third power switch transistor Q3 D<0.5, the operation principle is basically same and will not be repeated here.

Conversely, in the rectifier operation mode, the second power switch transistor Q2 and the fourth power switch transistor Q4 operate in the high frequency pulse width modulation (PWM) mode. The first power switch transistor Q1 and the third power switch transistor Q3 are in synchronous rectifier operation. The driving voltages of the first power switch transistor Q1 and the third power switch transistor Q3 are opposite to those of the second power switch transistor Q2 and the fourth power switch transistor Q4 respectively, while there is a certain dead time between the driving voltages of the first power switch transistor Q1 and the second power switch transistor Q2 and the driving voltages of the third power switch transistor Q3 and the fourth power switch transistor Q4. At the same time, the fifth power switch transistor Q5 and the sixth power switch transistor Q6 still turn on and off at the operating frequency. The operation principle is similar to that of the inverter operation mode and will not be repeated here.

In this solution, by generating a loop current with appropriate amplitude, zero voltage soft switching of the power switch transistors may be realized, and the reverse recovery power consumption of their body diodes may be reduced without limiting the control mode. Because the amplitude of the loop current is small, it will not cause excessive loop power consumption.

In conclusion, in case where the bi-directional split-phase inverter circuit adopts the modulation method where the adopted phase shift of interleaved phases $\phi \neq 360°/N$, the high frequency power switch transistors Q1~Q8 may all realize the zero voltage soft switching, and have the reverse recovery power consumption of the body diodes reduced, so that the switching power consumption is reduced or eliminated, and a higher conversion efficiency may be achieved.

Because of low switching power consumption, the bi-directional split-phase inverter circuit may operate at a higher switching frequency, thus reducing the volume of the inductors, capacitors and other passive devices, while reducing the cost. It may be observed from the waveform of $V_{MO}$ that the midpoint of the first inverting coupling transformer T1 provides a three-level output, as combined with the second inverting coupling transformer T2 of the second bi-directional switch network 10, the total transformer midpoint provides a five-level output. Multilevel operation may reduce the inductance of the filter inductor L, and reduce the output harmonic wave, improve the power quality, and may further reduce the switching power consumption of the power switch transistors and reduce the volume of the inductor and reduce the cost. The power switch transistors and the two windings of the transformer are connected in parallel to operate, share the current respectively, and the heat distribution is more balanced. In case where the duty ratio is 0.5, the current and heat at the two phases may be evenly divided, so as to improve the operation reliability of the bi-directional split-phase inverter circuit and the bi-directional split-phase inverter.

Optionally, in case where M≥3, the M filter inductors L are divided into two groups to be respectively connected to the two live wires C. Each group includes at least one filter inductor L and is connected to one same live wire C. Each filter inductor L is also connected to the midpoint of one inverting coupling transformer T.

Figure 7:
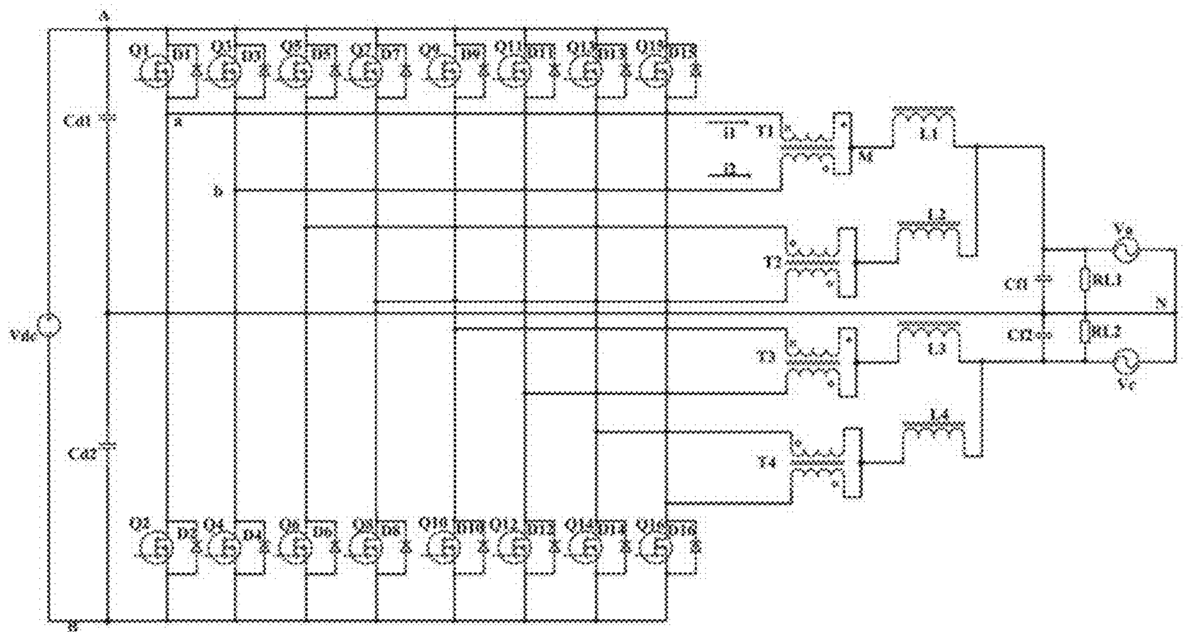
FIG. 7 is a schematic diagram of a fourth structure of the bi-directional split-phase inverter circuit provided in the embodiments of this disclosure.

Assuming that there are four bi-directional switch networks, as shown in FIG. 7, in the first bi-directional switch network, the first switch bridge arm includes the first power switch transistor Q1 and the second power switch transistor Q2, and the first power switch transistor Q1 is connected in series with the second power switch transistor Q2. The second switch bridge arm includes the third power switch transistor Q3 and the fourth power switch transistor Q4, and the third power switch transistor Q3 is connected in series with the fourth power switch transistor Q4. The bridge arm midpoint of the first switch bridge arm is connected to the first winding of the inverting coupling transformer T1, and the bridge arm midpoint of the second switch bridge arm is connected to the second winding of the inverting coupling transformer T1, the inverting coupling transformer T1 is connected to the first terminal of the filter inductor L1, and the first switch bridge arm and the second switch bridge arm constitute two non-interleaved parallel phases.

In the second bi-directional switch network, the first switch bridge arm includes the fifth power switch transistor Q5 and the sixth power switch transistor Q6, and the fifth power switch transistor Q5 is connected in series with the sixth power switch transistor Q6. The second switch bridge arm includes the seventh power switch transistor Q7 and the eighth power switch transistor Q8, and the seventh power switch transistor Q7 is connected in series with the eighth power switch transistor Q8. The bridge arm midpoint of the first switch bridge arm is connected to the first winding of the inverting coupling transformer T2, and the bridge arm midpoint of the second switch bridge arm is connected to the second winding of the inverting coupling transformer T2, the inverting coupling transformer T2 is connected to the first terminal of the filter inductor L2, and the first switch bridge arm and the second switch bridge arm constitute two non-interleaved parallel phases.

In the third bi-directional switch network, the first switch bridge arm includes the ninth power switch transistor Q9 and the tenth power switch transistor Q10, and the ninth power switch transistor Q9 is connected in series with the tenth power switch transistor Q10. The second switch bridge arm includes the eleventh power switch transistor Q11 and the twelfth power switch transistor Q12, and the eleventh power switch transistor Q11 is connected in series with the twelfth power switch transistor Q12. The bridge arm midpoint of the first switch bridge arm is connected to the first winding of the inverting coupling transformer T3, the bridge arm midpoint f of the second switch bridge arm is connected to the second winding of the inverting coupling transformer T3, the inverting coupling transformer T3 is connected to the first terminal of the filter inductor L3, and the first switch bridge arm and the second switch bridge arm constitute two non-interleaved parallel phases.

In the fourth bi-directional switch network, the first switch bridge arm includes the thirteenth power switch transistor Q13 and the fourteenth power switch transistor Q14, and the thirteenth power switch transistor Q13 is connected in series with the fourteenth power switch transistor Q14. The second switch bridge arm includes the fifteenth power switch transistor Q15 and the sixteenth power switch transistor Q16, and the fifteenth power switch transistor Q15 is connected in series with the sixteenth power switch transistor Q16. The bridge arm midpoint of the first switch bridge arm is connected to the first winding of the inverting coupling transformer T4, the bridge arm midpoint of the second switch bridge arm is connected to the second winding of the inverting coupling transformer T4, the inverting coupling transformer T4 is connected to the first terminal of the filter inductor L4, and the first switch bridge arm and the second switch bridge arm constitute two non-interleaved parallel phases.

The second terminal of the filter inductor L2 is connected to the second terminal of the filter inductor L1, and the second terminal of the filter inductor L4 is connected to the second terminal of the filter inductor L3. The second terminal of the filter inductor L1 and the second terminal of the filter inductor L3 are respectively connected to the two terminals of the second filter capacitor Cf. The AC power supply Vac is connected in parallel with the second filter capacitor Cf at the two terminals thereof.

The additional second bi-directional switch network and fourth bi-directional switch network are connected in a similar way as the first bi-directional switch network and the second bi-directional switch network in FIG. 6, which will not be repeated here. In addition, the operation principle of the four bi-directional switch networks is similar to the operation principle in the first embodiment, and will not be repeated here. The circuit structure of the four bi-directional switch network may achieve higher power levels.

Figure 8:
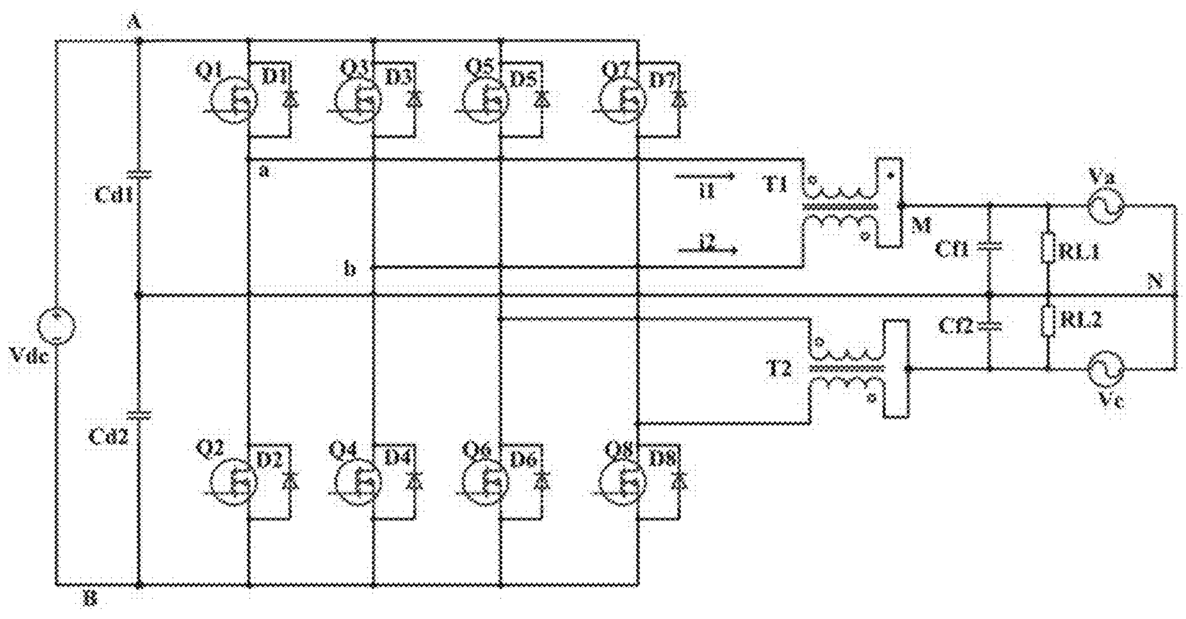
FIG. 8 is a schematic diagram of a fifth structure of the bi-directional split-phase inverter circuit provided in the embodiments of this disclosure.

Optionally, as shown in FIG. 3 and FIG. 8, the external filter inductor in FIG. 2 is removed and the equivalent leakage inductance of the coupling inductor is used as the filter inductor, which is a magnetic integration mode. The coupling inductor is convenient for standardized production, may reduce the number of the magnetic devices, and further reduce the volume and cost of the bi-directional inverter. The operation principle of soft switching and the modulation thereof are exactly the same as those in FIG. 3 and FIG. 4, and will not be repeated here.

Figure 9:
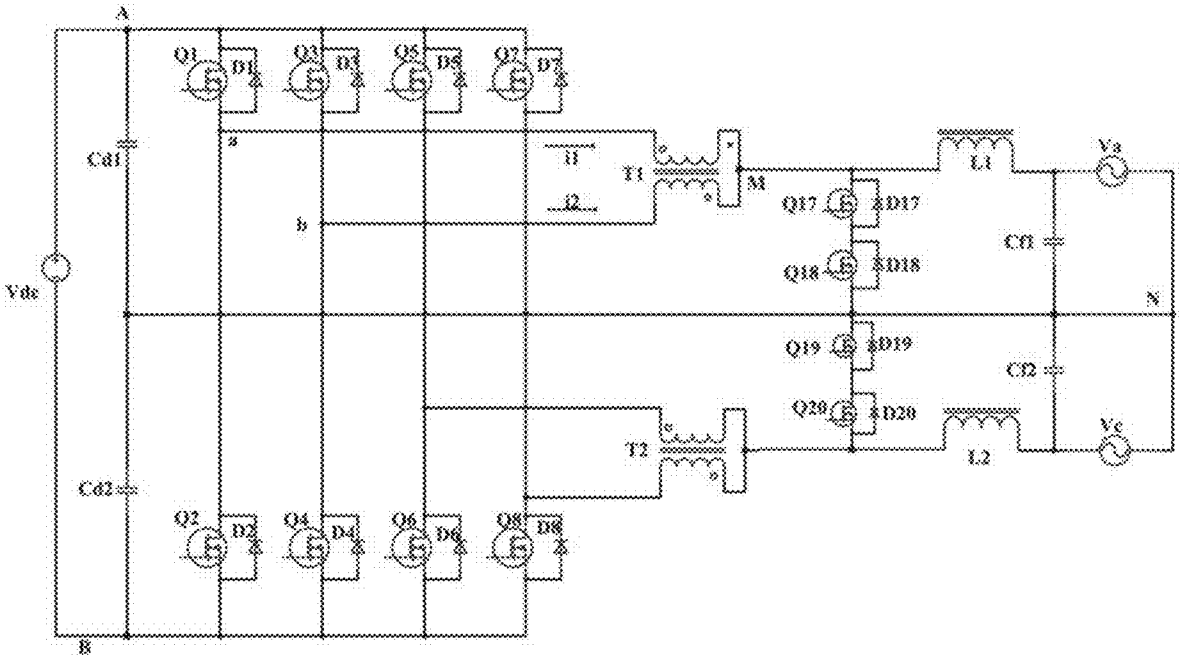
FIG. 9 is a schematic diagram of a sixth structure of the bi-directional split-phase inverter circuit provided in the embodiments of this disclosure.

Optionally, as shown in FIG. 9, the bi-directional split-phase inverter circuit further includes a free-wheeling bridge arm for free-wheel, which is connected between the midpoint of the inverting coupling transformer in the bi-directional switch network and the neutral wire N.

With the addition of the free-wheeling bridge arm, some of the operation principle of the bi-directional split-phase inverter circuit is similar to the bi-directional HERIC inverter circuit, and may reduce the common mode interference and leakage current of the bi-directional split-phase inverter circuit, and also from multilevel operation. The multilevel operation may reduce the inductance of the filter inductor L, so as to further reduce the volume and cost of the bi-directional split-phase inverter circuit and the bi-directional split-phase inverter. The operation principle of soft switching and the modulation thereof are basically similar to those in FIGS. 6~7, and will not be repeated here. It should be noted that, similar to the bi-directional HERIC inverter circuit, the free-wheeling bridge arm optionally includes a first free-wheeling switch transistor and a second free-wheeling switch transistor, for example, the first free-wheeling switch transistors Q17 and Q18, the second free-wheeling switch transistors Q19 and Q20. The first free-wheeling switch transistor and the second free-wheeling switch transistor are connected in series and then connected between the first terminal of the filter inductor L of the bi-directional switch network and the neutral wire N. The free-wheeling bridge arm further includes body diodes D17 to D20 connected with the free-wheeling switch transistors, and D17 to D20 are respectively connected with the respective first free-wheeling switch transistor and the second free-wheeling switch transistor in reverse parallel.

It should be noted that the above embodiments relate to a single two-phase non-interleaved parallel soft-switching bi-directional split-phase inverter circuit. In fact, the bi-directional switch network and the switch bridge arm of these bi-directional split-phase inverter circuit may also be extended to a multi-phase non-interleaved parallel soft-switching bi-directional split-phase inverter circuit or a circuit structure in a form of serial circuit, so as to achieve a higher power level.

The beneficial effects of the embodiments of this disclosure over the prior art are: in case where the above bi-directional split-phase inverter circuit adopts the inverting coupling transformer T for bi-directional power conversion, the switch bridge arm 1 may realize a current loop, such that before a corresponding power switch transistor of the switch bridge arm 1 turns on, its body diode is turned on first, thus reducing the reverse recovery power consumption of the body diode of the corresponding power switch transistor and realizing the zero voltage soft switching, and reducing the switch power consumption of the power switch transistor. At the same time, the midpoint of the inverting coupling transformer T may provide multi-level output, further reducing the switch power consumption of the power switch transistor.

This disclosure also provides a bi-directional split-phase inverter, which includes a bi-directional split-phase inverter circuit. One may refer to the above embodiments for the specific structure of the bi-directional split-phase inverter circuit. Since this bi-directional split-phase inverter adopts all the technical solutions of the above embodiments, it has at least all the beneficial effects brought by the technical solutions of the above embodiments, which will not be repeated in detail here.

The above embodiments are merely intended for describing but not for limiting the technical solutions of the present disclosure. Although the present disclosure is described in detail with reference to the above-mentioned embodiments, it should be understood by those skilled in the art that, the technical solutions recited in each of the above-mentioned embodiments may still be modified, or some of or all the technical features may be equivalently replaced, while these modifications or replacements do not make the essence of the corresponding technical solutions depart from the spirit and scope of the technical solution of each of the embodiments of the present disclosure.

What is claimed is:

1. A bi-directional split-phase inverter circuit, comprising a positive direct current (DC) bus, a negative DC bus, a first DC filter capacitor unit, a second DC filter capacitor unit, M alternating current (AC) filter capacitor units, M bi-directional switch networks, a neutral wire and M live wires, where M is an integer, and M≥2; wherein the first DC filter capacitor unit is connected between the positive DC bus and the neutral wire, the second DC filter capacitor unit is connected between the negative DC bus and the neutral wire, and one of the AC filter capacitor units is connected between each one of the live wires and the neutral wire;

each bi-directional switch network of the M bi-directional switch networks comprises an inverting coupling transformer, a filter inductor and multiple switch bridge arms;

a DC positive terminal and a DC negative terminal of the switch bridge arm are connected correspondingly and respectively with the positive DC bus and the negative DC bus, a bridge arm midpoint of each switch bridge arm is connected with a winding of the inverting coupling transformer, a midpoint of the inverting coupling transformer is connected with a first terminal of the filter inductor, and a second terminal of the filter inductor is connected to one of the live wires;

the live wires comprise a first live wire and a second live wire, and the bi-directional split-phase inverter circuit further comprises a controller;

the controller comprises:

a first voltage sampling unit, which is connected to the positive DC bus and performs voltage sampling on the positive DC bus to generate a first voltage sampling signal;

a second voltage sampling unit, which is connected to the negative DC bus and performs voltage sampling on the negative DC bus to generate a second voltage sampling signal;

a third voltage sampling unit, which is connected to the first live wire and performs voltage sampling on the first live wire to generate a third voltage sampling signal;

a fourth voltage sampling unit, which is connected to the second live wire and performs voltage sampling on the second live wire to generate a fourth voltage sampling signal;

a first current sampling unit, which is connected to the first live wire and performs current sampling on the first live wire to generate a first current sampling signal;

a second current sampling unit, which is connected to the second live wire and performs current sampling on the second live wire to generate a second current sampling signal;

a first comparison unit, which is connected to the first voltage sampling unit and to the first current sampling unit respectively, and is used for comparing the first voltage sampling signal and a first reference voltage signal, and generating a first feedback signal according to a comparison result and the first current sampling signal;

a second comparison unit, which is connected to the second voltage sampling unit and to the second current sampling unit respectively, and is used for comparing the second voltage sampling signal and a second reference voltage signal, and generating a second feedback signal according to a comparison result and the second current sampling signal;

a third comparison unit, which is connected to the third voltage sampling unit and to the second current sampling unit respectively, and is used for comparing the third voltage sampling signal and a third reference voltage signal, and generating a third feedback signal according to a comparison result and the second current sampling signal;

a fourth comparison unit, which is connected to the fourth voltage sampling unit and to the first current sampling unit respectively, and is used for comparing the fourth voltage sampling signal and a fourth reference voltage signal, and generating a fourth feedback signal according to a comparison result and the first current sampling signal;

a first control and wave generation unit, which is connected to the first comparison unit and to the second comparison unit respectively, and is used for generating a first control signal according to the first feedback signal and the second feedback signal;

a second control and wave generation unit, which is connected to the third comparison unit and to the fourth comparison unit respectively, and is used for generating a second control signal according to the third feedback signal and the fourth feedback signal;

a gating unit, which is connected to the first control and wave generation unit and to the second control and wave generation respectively, and is used for generating a PWM driving signal according to a control instruction, the first control signal and the second control signal; and a driver unit, which is connected to the gating unit and to the switch bridge arms of each bi-directional switch network respectively, and is used for generating a driving voltage of corresponding voltage value to each of the switch bridge arms according to the PWM driving signal, so as to drive the bi-directional switch network for rectification or AC conversion, and correspondingly outputting an AC signal or a DC signal of a preset voltage value.

2. The bi-directional split-phase inverter circuit according to claim 1, wherein in case where M≥3, the M filter inductors are divided into two groups to be respectively connected to the first and second live wires, each group comprises at least one of the filter inductors and is connected to a same one of the live wires, and each filter inductor is also connected to a midpoint of one of the inverting coupling transformers.

3. The bi-directional split-phase inverter circuit according to claim 1, wherein the switch bridge arm comprises two power switch transistors connected in series and two body diodes respectively connected with one of the power switch transistors in reverse parallel;

the two power switch transistors are connected in series and then connected between the positive DC bus and the negative DC bus, and a bridge arm midpoint of the two power switch transistors is connected with a winding of the inverting coupling transformer.

4. The bi-directional split-phase inverter circuit according to claim 1, wherein the filter inductor is an equivalent leakage inductance of the inverting coupling transformer.

5. The bi-directional split-phase inverter circuit according to claim 1, wherein the bi-directional split-phase inverter circuit further comprises a free-wheeling bridge arm for free-wheel; and the free-wheeling bridge arm is connected between a midpoint of the inverting coupling transformer in the bi-directional switch network and the neutral wire.

6. The bi-directional split-phase inverter circuit according to claim 5, wherein the free-wheeling bridge arm comprises a first free-wheeling switch transistor and a second free-wheeling switch transistor; and the first free-wheeling switch transistor and the second free-wheeling switch transistor are connected in series and then connected between a first terminal of the filter inductor of the bi-directional switch network and the neutral wire.

7. The bi-directional split-phase inverter circuit according to claim 1, wherein driving signals received by an upper arm and a lower arm of the switch bridge arm have potentials of opposite levels and are provided with a preset dead time, and condition of conduction of the switch bridge arm is $$D > 0.5 \text{ and } \Phi < (1 - D), \text{ or } D < 0.5 \text{ and } \Phi < D;$$

where D represents an operation duty ratio of the upper arm or the lower arm of the respective switch arms, $\phi$ represents an operation phase difference between the respective switch arms, and the operation phase difference is greater than the dead time of the respective switch arms.

8. A bi-directional split-phase inverter, comprising a bi-directional split-phase inverter circuit, wherein the bi-directional split-phase inverter circuit comprises a positive direct current (DC) bus, a negative DC bus, a first DC filter capacitor unit, a second DC filter capacitor unit, M alternating current (AC) filter capacitor units, M bi-directional switch networks, a neutral wire and M live wires, where M is an integer and M≥2; wherein the first DC filter capacitor unit is connected between the positive DC bus and the neutral wire, the second DC filter capacitor unit is connected between the negative DC bus and the neutral wire, and one of the AC filter capacitor units is connected between each one of the live wires and the neutral wire;

each bi-directional switch network of the M bi-directional switch networks comprises an inverting coupling transformer, a filter inductor and multiple switch bridge arms;

a DC positive terminal and a DC negative terminal of the switch bridge arm are connected correspondingly and respectively with the positive DC bus and the negative DC bus, a bridge arm midpoint of each switch bridge arm is connected with a winding of the inverting coupling transformer T, a midpoint of the inverting coupling transformer is connected with a first terminal of the filter inductor, and a second terminal of the filter inductor is connected to one of the live wires;

the live wires comprise a first live wire and a second live wire, and the bi-directional split-phase inverter circuit further comprises a controller;

the controller comprises:

a first voltage sampling unit, which is connected to the positive DC bus and performs voltage sampling on the positive DC bus to generate a first voltage sampling signal;

a second voltage sampling unit, which is connected to the negative DC bus and performs voltage sampling on the negative DC bus to generate a second voltage sampling signal;

a third voltage sampling unit, which is connected to the first live wire and performs voltage sampling on the first live wire to generate a third voltage sampling signal;

a fourth voltage sampling unit, which is connected to the second live wire and performs voltage sampling on the second live wire to generate a fourth voltage sampling signal;

a first current sampling unit, which is connected to the first live wire and performs current sampling on the first live wire to generate a first current sampling signal;

a second current sampling unit, which is connected to the second live wire and performs current sampling on the second live wire to generate a second current sampling signal;

a first comparison unit, which is connected to the first voltage sampling unit and to the first current sampling unit respectively, and is used for comparing the first voltage sampling signal and a first reference voltage signal, and generating a first feedback signal according to a comparison result and the first current sampling signal;

a second comparison unit, which is connected to the second voltage sampling unit and to the second current sampling unit respectively, and is used for comparing the second voltage sampling signal and a second reference voltage signal, and generating a second feedback signal according to a comparison result and the second current sampling signal;

a third comparison unit, which is connected to the third voltage sampling unit and to the second current sampling unit respectively, and is used for comparing the third voltage sampling signal and a third reference voltage signal, and generating a third feedback signal according to a comparison result and the second current sampling signal;

a fourth comparison unit, which is connected to the fourth voltage sampling unit and to the first current sampling unit respectively, and is used for comparing the fourth voltage sampling signal and a fourth reference voltage signal, and generating a fourth feedback signal according to a comparison result and the first current sampling signal;

a first control and wave generation unit, which is connected to the first comparison unit and to the second comparison unit respectively, and is used for generating a first control signal according to the first feedback signal and the second feedback signal;

a second control and wave generation unit, which is connected to the third comparison unit and to the fourth comparison unit respectively, and is used for generating a second control signal according to the third feedback signal and the fourth feedback signal;

a gating unit, which is connected to the first control and wave generation unit and to the second control and wave generation respectively, and is used for generating a PWM driving signal according to a control instruction, the first control signal and the second control signal; and a driver unit, which is connected to the gating unit and to the switch bridge arms of each bi-directional switch network respectively, and is used for generating a driving voltage of corresponding voltage value to each of the switch bridge arms according to the PWM driving signal, so as to drive the bi-directional switch network for rectification or AC conversion, and correspondingly outputting a AC signal or a DC signal of a preset voltage value.

9. The bi-directional split-phase inverter according to claim 8, wherein in case where M≥3, the M filter inductors are divided into two groups to be respectively connected to the first and second live wires, each group comprises at least one of the filter inductors and is connected to a same one of the live wires, and each filter inductor is also connected to a midpoint of one of the inverting coupling transformers.

10. The bi-directional split-phase inverter according to claim 8, wherein the switch bridge arm comprises two power switch transistors connected in series and two body diodes respectively connected with one of the power switch transistors in reverse parallel;

the two power switch transistors are connected in series and then connected between the positive DC bus and the negative DC bus, and a bridge arm midpoint of the two power switch transistors is connected with a winding of the inverting coupling transformer.

11. The bi-directional split-phase inverter according to claim 8, wherein the filter inductor is an equivalent leakage inductance of the inverting coupling transformer.

12. The bi-directional split-phase inverter according to claim 8, wherein the bi-directional split-phase inverter circuit further comprises a free-wheeling bridge arm for free-wheel; and the free-wheeling bridge arm is connected between a midpoint of the inverting coupling transformer in the bi-directional switch network and the neutral wire.

13. The bi-directional split-phase inverter according to claim 12, wherein the free-wheeling bridge arm comprises a first free-wheeling switch transistor and a second free-wheeling switch transistor; and the first free-wheeling switch transistor and the second free-wheeling switch transistor are connected in series and then connected between a first terminal of the filter inductor of the bi-directional switch network and the neutral wire.

14. The bi-directional split-phase inverter according to claim 8, wherein driving signals received by an upper arm and a lower arm of the switch bridge arm have potentials of opposite levels and are provided with a preset dead time, and condition of conduction of the switch bridge arm is $$D > 0.5 \text{ and } \Phi < (1 - D), \text{ or } D < 0.5 \text{ and } \Phi < D;$$

where D represents an operation duty ratio of the upper arm or the lower arm of the respective switch arms, ϕ represents an operation phase difference between the respective switch arms, and the operation phase difference is greater than the dead time of the respective switch arms.

* * * * *